July 31, 1956 J. O. ELY 2,757,358
MECHANICALLY COUPLED ACOUSTIC WELL LOGGING SYSTEM
Filed April 3, 1953 5 Sheets-Sheet 1

JOHN O. ELY
INVENTOR.

BY D. Carl Richards
AGENT

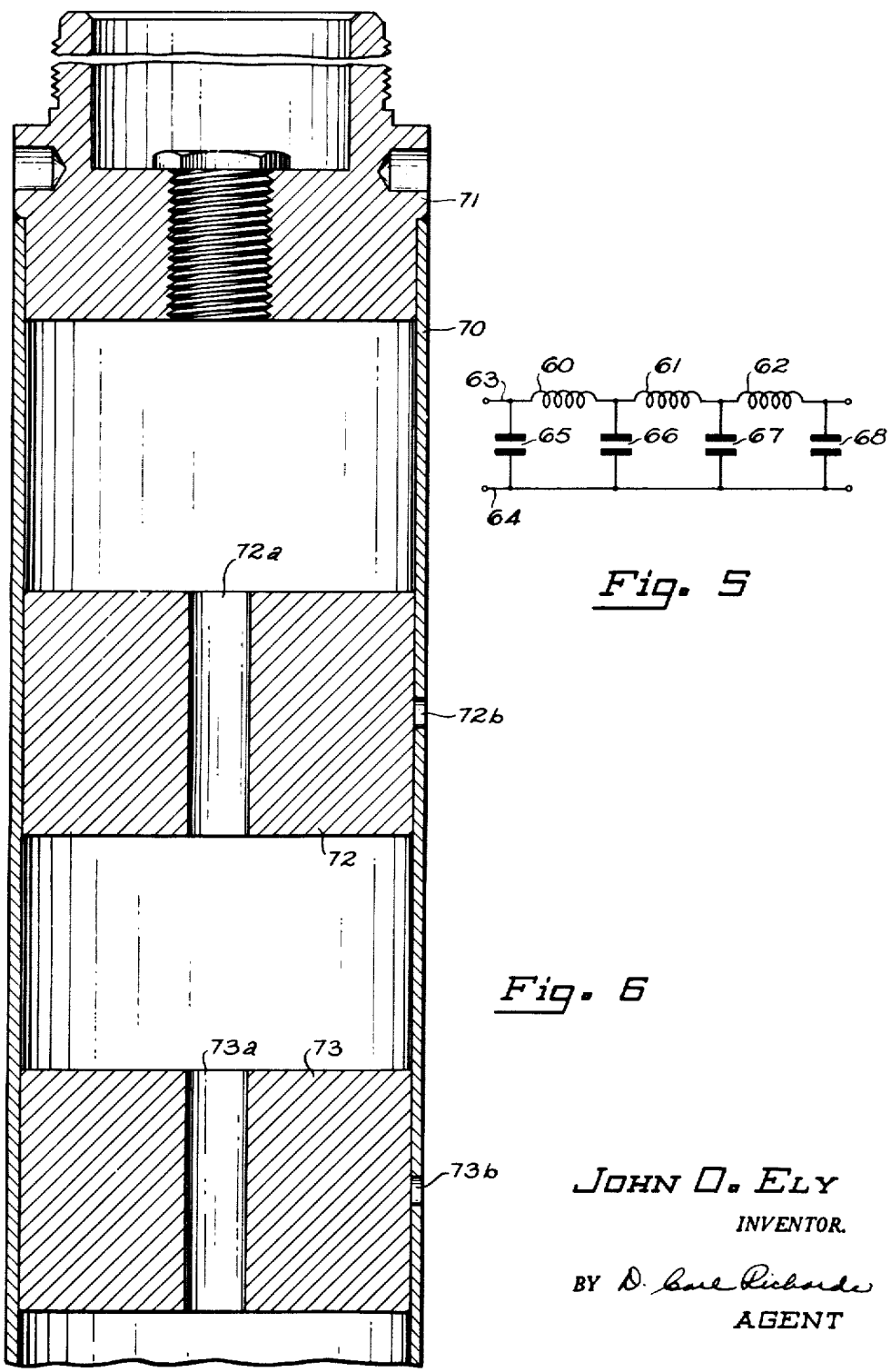

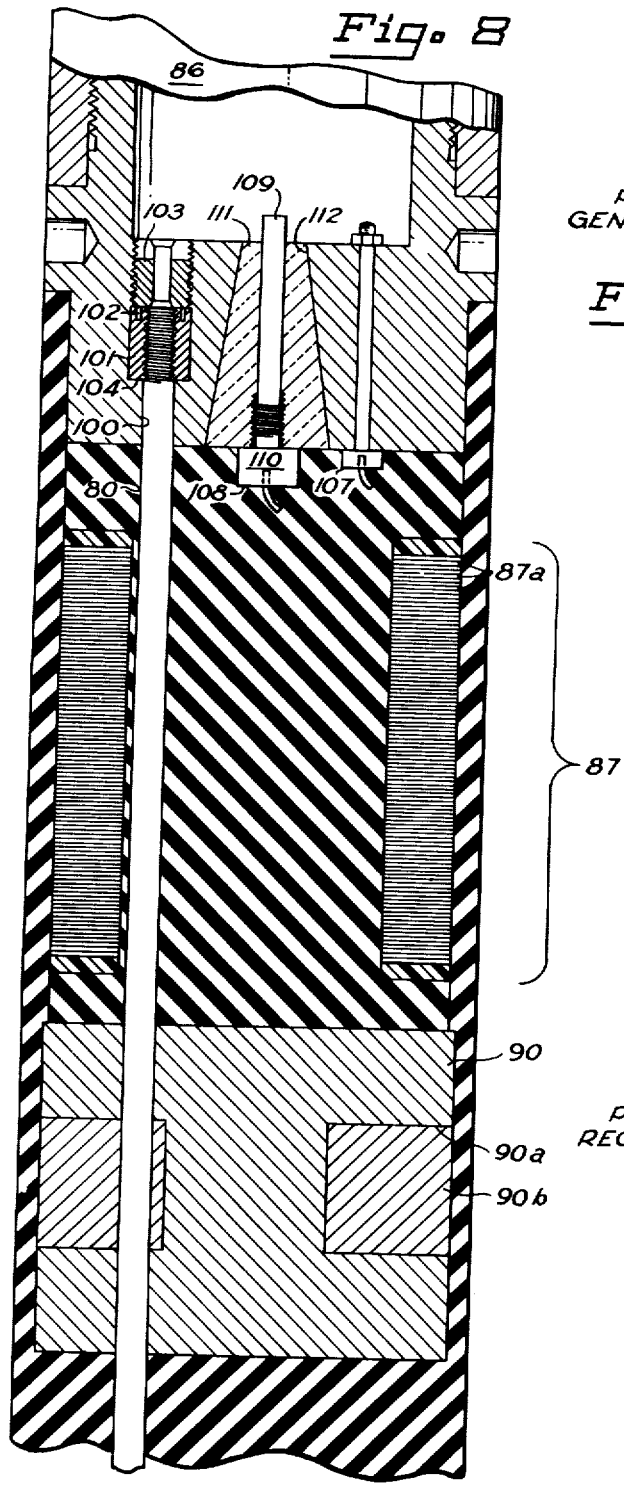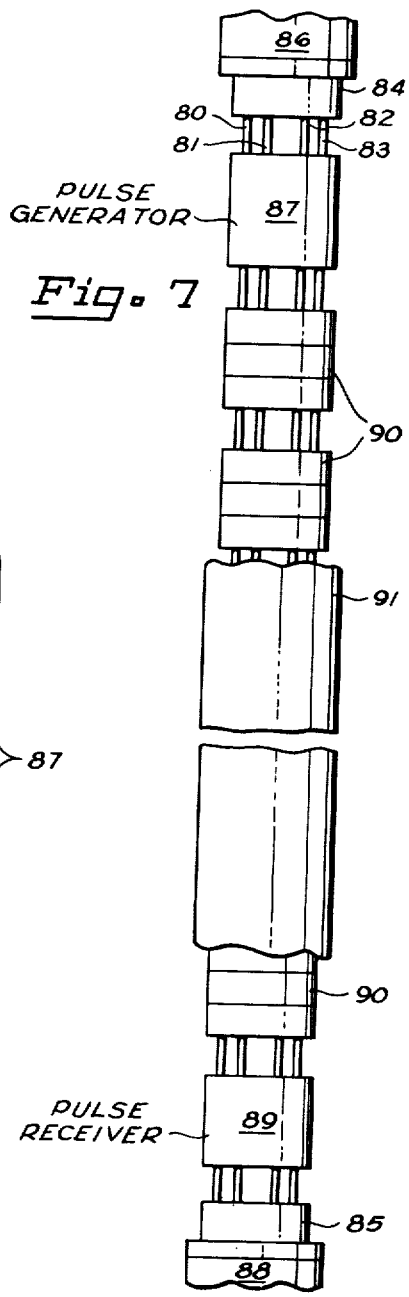

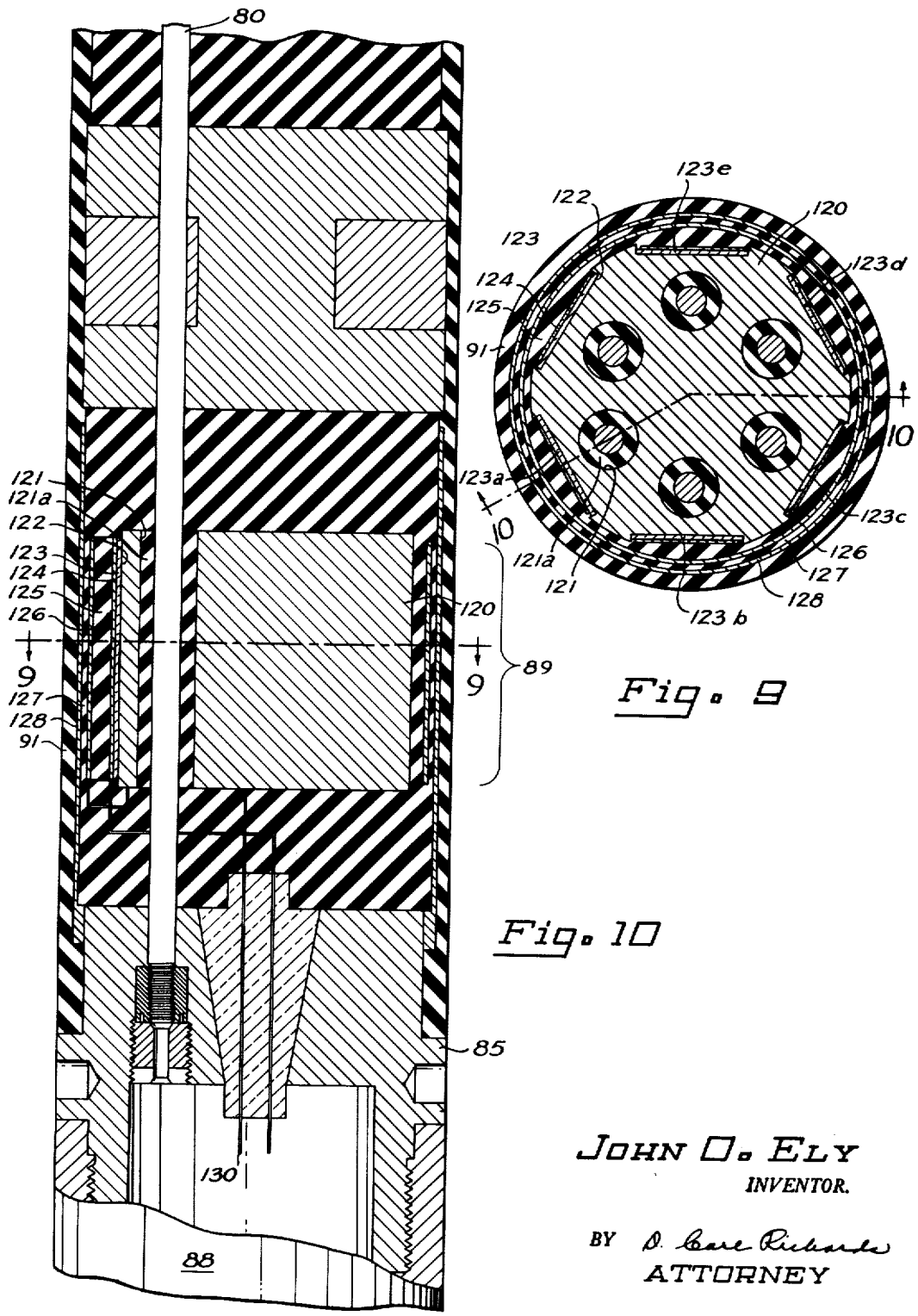

United States Patent Office 2,757,358
Patented July 31, 1956

2,757,358
MECHANICALLY COUPLED ACOUSTIC WELL LOGGING SYSTEM

John O. Ely, Dallas, Tex., assignor, by mesne assignments, to Socony Mobil Oil Company, Inc., a corporation of New York Continuation of abandoned application Serial No. 307,055, August 29, 1952. This application April 3, 1953, Serial No. 346,593

9 Claims. (Cl. 340—18)

This invention relates to acoustic well logging and more particularly to a coupled system in which a pair of acoustic transducers are maintained in a predetermined spaced relation rigidly connected together and in which direct transmission of selected acoustic waves in the connecting means is eliminated.

This application is a continuation of application Serial No. 307,055 filed August 29, 1952, now abandoned.

Measurement of the sound transmission properties of the earth adjacent the walls of a bore hole usually involves the use of two or more acoustic transducers for the production of acoustic waves in the formations and the detection of such waves after travel through a selected earth segment for generation of a signal related to the desired earth property.

For example in the co-pending application Serial No. 192,750 of Gerald C. Summers, now Patent No. 2,704,364, dated March 15, 1955, for Velocity Well Logging, the time interval between the production of an acoustic pulse at a first point in the formation and its reception at a second point spaced from the first point is measured as a function of bore hole depth. Further, in co-pending application Serial No. 197,074 of Gerald C. Summers et al., now Patent No. 2,691,422, dated October 12, 1954, for Selective Pulse Acoustic Well Logging Apparatus, the magnitude of a pulse traveling over a selected earth path is measured in order to evaluate the attenuation properties of the formations. In well logging systems such as generically disclosed by the above-identified applications, direct transmission of compressional waves through structure interconnecting the transducers is undesirable for such sound may mask the sound waves traveling through the formations and preclude the obtainment of a useful log. In prior art systems, the necessity of providing some coupling means between the transducers in order to maintain them a predetermined distance apart and, of course, in order to move them as a unit along the length of the bore hole has completely dominated the desirability of eliminating direct transmission.

It is an object of the present invention to provide a rigid coupling for a pair of transducers which will not transmit the sound waves from one transducer to the other.

It is a further object of the invention to provide an acoustic well logging system that is a rigid unitary structure, including therein a sound source and a sound receiver, in which the sound with respect to which the receiver is sensitive will not be transmitted by structure intermediate the source and receiver.

In accordance with the present invention, a rigid coupling is provided with low acoustic conductance. The rigid coupling, having strength sufficient to maintain a fixed separation between the transducers, is provided with attenuation properties as substantially completely to prevent transmission of desired acoustic pulses from one transducer to the other thereby to eliminate any such interference as ordinarily is found in prior art structures.

More particularly, there is provided a coupling for a pair of transducers in a well logging system which comprises a coupling means secured at the ends thereof to the transducers to maintain the transducers in spaced apart relation and a plurality of weighting means secured along the coupling means at intervals that are short compared to the wave length of the waves in the coupling means, each weight having mass sufficient to form with the coupling means a structure of low acoustic conductance to the desired waves. Thus there is no transmission of waves in a relatively broad frequency band, and it is thereby assured that signals produced by the receiver transducer are dependent only upon waves traveling through earth formations.

In accordance with a more specific aspect of the invention, there is provided a plurality of rigid elongated rods with an acoustic transducer supported at one end thereof and a receiver at the other end thereof. Means are provided for energizing the transducer for the production of pulses of a predetermined frequency content. A plurality of masses are supported in a predetermined spaced apart relation along the elongated rods to form a mechanical filter which rejects acoustic waves at the frequencies of the pulses whereby the receiver is actuated and produces signals only in response to acoustic energy traveling thereto by paths other than through said elongated rods.

For a more complete understanding of the invention and for further objects and advantages thereof, reference may now be had to the following description taken in conjunction with the accompanying drawings in which:

Fig. 1 diagrammatically illustrates the invention;

Fig. 5 is an electrical equivalent of the coupling member illustrated in Fig. 2;

Fig. 6 is a sectional view of a modification of the invention;

Fig. 7 is a partial view of a further modification of the invention;

Fig. 8 is a detailed sectional view of the upper end of the system of Fig. 7;

Fig. 9 is a cross-section of the receiver structure taken along the lines 9—9 of Fig. 10; and Fig. 10 is a detailed sectional view of the receiver and coupling structure taken along the lines 10—10 of Fig. 9.

Figure 1:
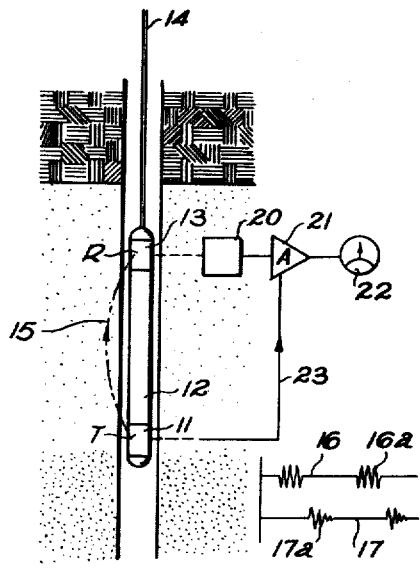

Referring first to Fig. 1, there is illustrated a unit for measuring the properties of the strata adjacent a bore hole 10. In this form the exploring unit includes a transmitter 11, a coupling unit 12 and a receiver 13 movably supported in the bore hole by cable means 14. Transmitter 11 may be of the type illustrated in the above-identified applications for the production of acoustic pressure waves in the media in which it is immersed. Pressure waves generated by the transmitter 11 travel to the formations through the bore hole liquid and thence through formations generally along the dotted path 15 to the receiver 13 where they are detected. To illustrate the invention and its application, assume that the generated acoustic wave has the form illustrated by the time plot 16. The wave detected by receiver 13 may have the form generally as shown in the time plot 17. Responsive to the discrete time pulses 16a, the voltage generated by receiver 13 may comprise the same frequency components as pulses 16a but delayed in time as indicated by the pulses 17a. The amplitude of the received pulses 17a or the delay occasioned by their travel from transmitter to receiver may be measured. In accordance with the disclosure of the above identified Patent No. 2,704,364, the pulse received by the receiver 13 passes through a filter network 20 and is applied to a gated amplifier 21 for the production of a D. C. voltage proportional in magnitude to the travel time of the pulse between transmitter 11 and receiver 13. Suitable measuring means such as a meter 22 is utilized to measure the latter voltage. The amplifier 21 is gated by applying a voltage pulse thereto via a communicating channel 23 coincident with generation of each acoustic pulse.

In order to assure freedom from interference and to make certain that the pulses measured are those which have traveled through to formations, applicant provides the rigid coupling means 12 between the transmitter and receiver which provides adequate mechanical support to maintain the transmitter and receiver in a fixed relationship but which has a characteristic filtering action to prevent direct transmission therethrough of acoustic waves having frequency components that are to be measured.

The pulses 16a may comprise a 10,000 cycle per second signal pulsed at a rate in the low audio range, for example from 20 to 60 times per second. If so, the coupling member 12 may be constructed to prevent transmission of all acoustic waves of frequencies above a frequency in the order of 7,500 cycles per second so that the signal at receiver 13 will consist of waves traveling only by way of the formations. Filter 20 may then be devised to pass only those components of the signal above 7,500 cycles per second so that only the latter components will reach amplifier 21 and thus affect measurements.

It will be understood that the measuring circuits including filter 20, amplifier 21, meter 22 and the connection 23 may be conveniently located at the earth's surface or other points in the system and that they have been shown in their functional relationship in Fig. 1 in order more clearly to illustrate the present invention.

Figure 2:
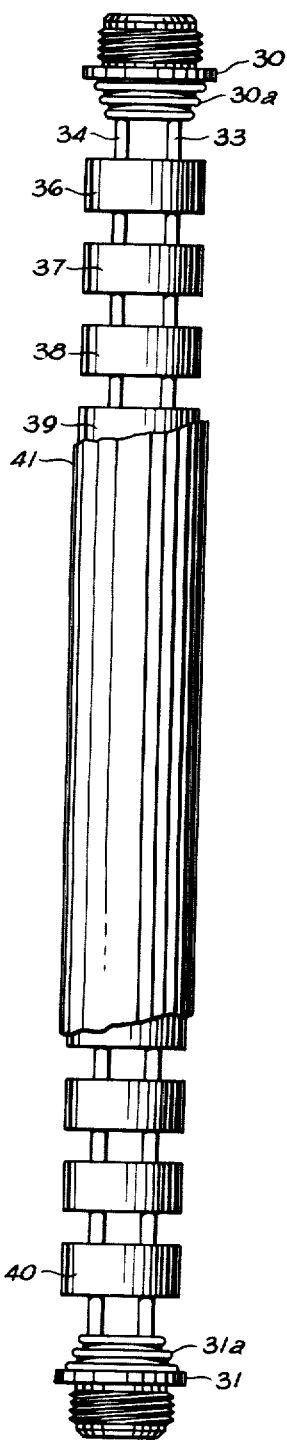
Fig. 2 is an elevation view partially broken away of the coupling member of Fig. 1.

In Fig. 2 one form of the coupling member has been illustrated as comprising an upper end member 30 and a lower end member 31 both of which are adapted threadedly to engage associated housings for the components of the transmitter 11 (Fig. 1) and the receiver 13. A pair of rods 33 and 34 preferably metallic, steel for example, are rigidly secured at the ends thereof to the upper coupling member 30 and the lower coupling member 31. The rods 33 and 34 have a total cross-sectional area which is very much less than the cross-sectional area of the associated component housings. Uniformly spaced at selected points along the rods 33 and 34 are a plurality of weights 36, 37, 38, 39—40. The weights conveniently may be of lead or other high density material as to present at each juncture of weight and rod an acoustic mismatch. Thus there is produced a multi-section low-pass acoustic filter. It may be considered as a series of couplings having compliance alternately loaded with masses in which the coupling or "spring sections" are the short lengths of steel rods and the masses are the lead weights.

The structure comprising rods and weights is encased in a rubber sheath 41 which completely fills the spaces between the rods and weights and also provides a relatively thin coating over the periphery of the weights. The coating 41 is moulded to the grooved surfaces 30a and 31a of end members 30 and 31 to form a streamlined unit of dimensions corresponding to those of the component housings and thus unlikely to lodge or to be caught on protuberances along the wall of a bore hole.

The modification illustrated in Fig. 2 may be coupled at its ends respectively to an acoustic transmitter and to a receiver in a system in which the transmitter has an output predominantly at a frequency above the cutoff frequency of the coupling unit. In such a system direct-traveling waves of the predominant frequency will be eliminated leaving the receiver system free of interference in detection of waves traveling via the earth path.

Figure 3:
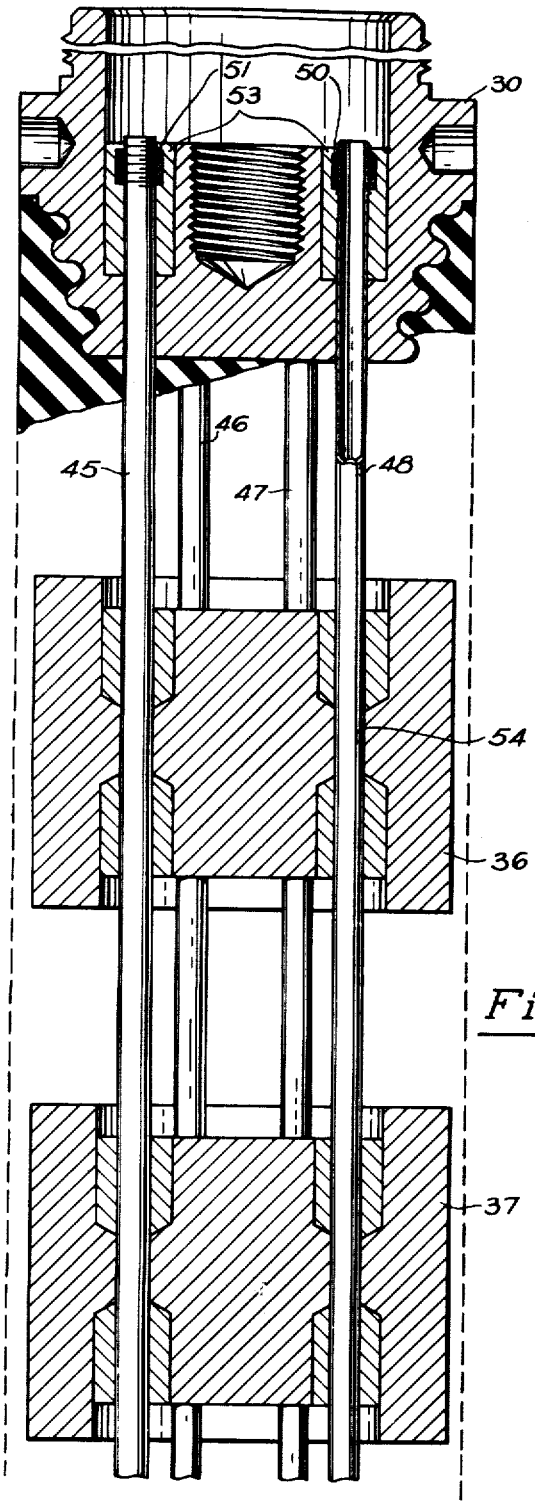
Fig. 3 illustrates in cross-section a portion of the coupling member.

In Fig. 3 the structure of the coupling unit is illustrated in more detail. Where appropriate, the same reference characters are used as in Figs. 1 and 2. Only the upper connecting element 30 is shown together with the first two weighting members 36 and 37. In this form six hollow tubes, four of which, the tubes 45, 46, 47 and 48, are shown, are utilized to couple the end member 30 to its associated member (not shown). The upper ends of each of the rods are threaded as shown and fitted with suitable nuts 50 and 51. Molten metal poured around the upper ends of the rods serves to form anchor plugs 53 for the rods.

The weights 36 and 37 are provided with channels such as the channel 54 for each of the rods 45–48 and the two additional rods not shown. The channel 54 snugly receives the associated rod 48 at a point spaced from element 30. The channel 54 is reentrant on both sides of the weight 36. In assembling the units, rods are inserted through the openings in each of the weights. When the weights are properly spaced one from the other and from the end members, the reentrant openings are poured full of a bonding material to secure the weights at the preferred locations. Thereupon the whole unit is covered with a rubber composition preferably applied by heat molding to form a smooth-surface integral unit.

Figure 4:
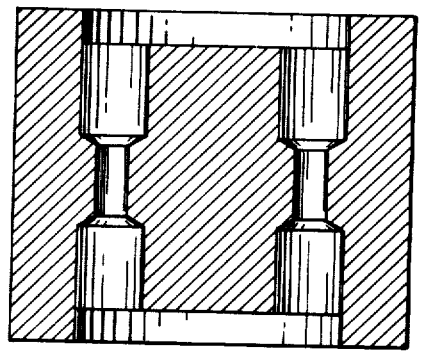
Fig. 4 is a detailed view of one of the weighting members.

Thus constructed, the unit mechanically is analogous to electrical systems such as illustrated in Fig. 5 in which series inductances 60, 61 and 62 connected to conductor 63 are shunted to conductor 64 by condensers 65, 66, 67 and 68 to form a low pass electrical filter. As the filter of Fig. 5 passes low frequency electrical signals and attenuates high frequency electrical signals, the mechanical system of Figs. 2–4 passes low frequency acoustic signals and attenuates high frequency acoustic signals.

The cutoff frequency of applicant's coupling will be determined by the elastic properties of the connecting rods 45–48, the spacing between the weights 36, 37, etc. and the mass of the weights. By way of example and not intending to limit the present invention, the following parameters were used for a coupling unit designed for use in a system in which the acoustic signal comprised components predominantly at or about 10,000 cycles per second. In that system stainless steel tubes of ¼" outer diameter and ³⁄₃₂" internal diameter supported 14 lead weights each of which was 2" long. The weights were spaced along the rods with 2" separations and each weighed approximately 7 pounds. The resulting mechanical coupling had a cutoff frequency at approximately 5,000 cycles per second and at 10,000 cycles per second had an acoustic conductance approaching zero. In conjunction therewith the electrical filter 20 at the output of receiver 13, Fig. 1, had a high pass characteristic with a cutoff frequency at approximately 7,500 cycles per second.

In designing a coupling unit of the type herein described, the relationship between the principal parameters may be expressed as follows:

$$f_c = \frac{1}{\pi + \sqrt{\frac{ML}{AE}}}$$

where

M is the mass of each weight;
L is the length of the supporting material between weights;
A is the cross-sectional area of the connecting elements; and
E is Young's modulus for the connecting material.

Referring now to Fig. 6, a modified form of the invention is illustrated as comprising a thin walled stainless steel tube 70 secured at its upper end as by welding or other suitable means to an end coupling member 71. A plurality of weights, such as the weights 72 and 73, are secured at spaced points internally of the cylinder 70. The cylinder 70 is the functional equivalent of the rods 45–48 of Fig. 3, while the lead weights are the functional equivalents of the weights 36 and 37. In this system the stainless steel cylinder 70 will rigidly couple acoustic transducers as in the system of Fig. 3. However in order to withstand high hydrostatic heads encountered at great depths in bore holes, the interior of cylinder 70 preferably will be filled with a non-compressible liquid. For this purpose a channel 72a is provided through the weight 72, and similar channels are provided in the additional weights which do not appear in Fig. 6. The acoustic contrast between such liquids and the weights prevents the direct transmission of acoustic energy so that operation in so far as acoustic conductance is concerned is subtantially the same with or without the liquids.

Fabrication of a device of the type illustrated in Fig. 6 may be accomplished by providing a bonded sand mold comprising discs initially positioned in the spaces shown in Fig. 6 between weights 72, 73, etc. When suitably located, molten lead may be introduced as through openings 72b and 73b in the wall of the cylinder 70. When the molten metal has solidified, a suitable solvent for the sand bonding material may be introduced to one end to permit the sand particles to be washed from the structure.

In the system illustrated in Fig. 3 electrical conductors may be threaded through the tubes 45–48 to provide electrical transmission paths to and from the transmitter 11 of Fig. 1 if such paths are necessary. In Fig. 6 hermetically sealed terminals (not shown) may be embodied in the coupling unit 71 with conductors threaded through the central channels 72a and 73a to a similar sealing unit in the lower coupling member (not shown).

In the modification of the invention illustrated in Figs. 7–10 two transducers effectively replace the two weights positioned respectively at opposite ends of the system disclosed in Fig. 2. In this form the transducers are not housed inside the units secured to the ends of the coupling but rather are exposed to bore hole pressures.

More particularly referring first to Fig. 7, small diameter tubes or rods 80–83 extend between threaded end members 84 and 85. A suitable housing 86 for circuit components associated with a first transducer 87, in one form a pulse generator, is connected to the upper end member 84. A similar housing 88 is provided for circuit components associated with a second transducer 89, for example a pulse receiver. Transducer 87 is mounted on and supported by rods 80–83 immediately below the upper end member 84. The transducer 89 similarly is supported by rods 80–83 immediately above the lower end member 85. A plurality of weights 90 are mounted at uniformly spaced intervals along the rods 80–83 between the transducers 87 and 89. All of the elements between members 84 and 85 are moulded into a rubber mass or sheathing 91 (shown only in part in Fig. 7).

Fig. 8 illustrates in greater detail the transducer 87 and the means for securing the rods 80–83 to the end member 84. In order to secure rod 80 to the member 84 a channel 100 extends through the bulkhead portion of coupling 84 and fits rod 80 snugly at the lower portion thereof. Channel 100 is reentrant to form an upper portion of enlarged diameter. The upper end of rod 80 is threaded to receive a nut 101 which has a cylindrical outer periphery to fit into the reentrant portion of channel 100. The nut 101 is provided with a plurality of holes 102 in the upper surface thereof to accommodate a wrench or other device to serve the nut onto rod 80. A second nut 103 is then positioned in the upper portion of channel 100, threadedly engaging the walls thereof to force the bottom of nut 101 down onto the seat or shoulder 104 at the bottom of the reentrant portion of channel 100. Nut 103 is itself provided with a central passage to accommodate conductors extending from the chamber inside housing 86 through rod 80. By such construction the nut 101 prevents movement of the rod 80 relative to member 84 when tensional forces are applied between member 84 and the rod 80. Nut 103 prevents such relative movement when compressional forces are thus applied. At the same time a liquid-tight seal is effected at the point of entry of rod 80 into member 84. When thus secured both to the upper member 84 and as illustrated in Fig. 9 to the lower member 85, the rod 80 plus five additional rods not shown in Fig. 8 but positioned uniformly along the periphery of a circle provide a rigid structure which will withstand either tension or compression and provide a supporting means for the transducers.

As illustrated in Fig. 8, the transducer 87 comprises a plurality of washer-like laminations 87a of magnetic material stacked as to form an elongated cylinder. The cylinder thus formed is positioned to encircle the supporting rods. A winding described in greater detail hereinafter but not shown in Fig. 8 is wound around the cylinder in the form of a toroid. The ends of the windings are connected to terminals 107 and 108 in order to conduct signals through member 84. More particularly, the terminal 108 includes an elongated rod 109 which is integral with a head 110. The portion of the rod adjacent head 110 is threaded, the threads being complementary with the tapped portion of the insulator 111. Insulator 111, preferably a ceramic unit, is in the form of a truncated cone and similarly is complementary with a bore 112 extending through the bulkhead portion of member 84. The second terminal 107 at low potential requires little if any insulation to form a low impedance path through or with the bulkhead. On the other hand, terminal 108, while secured in a pressure resistant liquid-tight manner to member 84, provides a path insulated from the member 84 and capable of withstanding application of very high potentials.

The weights 90 are cylindrical in form and of a heavy metal such as lead. Before assembly a groove 90a is turned or otherwise provided in the periphery intermediate its ends which extends to a depth beyond the rod 80. Once the weights are in proper position, the portion 90b is supplied to anchor the weight 90 to the rods, such as rod 80. For example the portion 90b of the mass may be of solder poured in molten form into the annular groove 90a and allowed to cool.

Referring now to Figs. 9 and 10, the receiver structure is illustrated as comprising a mass 120 which is roughly hexagonal in shape. Six holes such as the hole 121 are provided to receive the supporting rods. Rubber tubes such as tube 121a support mass 120 while insulating it from the rods. The mass 120, originally cylindrical in form, is milled to provide a plurality of flat surfaces such as surface 122 at uniformly spaced locations around its periphery. In each of the surfaces 122 there is provided a piezo-electric device, preferably a quartz crystal capable of withstanding high bore hole temperatures and pressure. For example crystal 123 is secured to and is in contact with surface 122. An electrode 124 is then positioned in contact with the outer surface of the crystal 123. An insulating layer of rubber 125 is then formed around the mass 120 filling in the milled portions above electrode 124. A cylindrical shield 126 of conductive metal encircles the rubber sheath 125 and is connected electrically (by means not shown) to the mass 120. A second rubber sheath 127 covers the metallic shield 126 and insulates it from an outer conductive shield 128. The moulded rubber sheath 91 then encases the entire structure.

In Fig. 10, where like parts have been given the same reference characters as in Figs. 7–9, it will be seen that the outer shield 128 is elongated and extends below transducer 89 where it is secured to the lower member 85. Shields 126 and 128 form an electrostatic barrier for the crystals mounted on mass 120. A first electrical conductor 130 is connected to the metallic mass 120. A second electrical conductor 132 is connected to electrode 124 and to each of the additional electrodes associated with the crystals 123a–e, Fig. 9. Thus the voltage produced upon detection of acoustic pulses and appearing between conductors 131 and 132 may be applied to an amplifier supported in the housing 88.

In the system illustrated in Figs. 7–10 the exploring unit includes a magnetostrictive element supported by rods at one end which at their other ends support a quartz crystal device which will withstand high bore hole temperature and pressure and yet is insensitive to and independent of the magnetic field produced upon excitation of the magnetostrictive transducer.

In either of the systems above described it will be seen that the transducers are positioned at the ends of rigid means and are maintained in a predetermined relation one to the other. The weighting means secured at spaced points along the coupling rods are of mass sufficient to form, with the rigid rods, a structure of low transmissivity to acoustic waves to be detected by the receiver. Thus there is eliminated direct transmission of acoustic waves through the coupling medium and the difficulties attending such transmission.

While several modifications of the invention have been described in detail, it will be understood that further modifications will now suggest themselves to those skilled in the art and it is intended to cover such modifications as fall within the scope of the appended claims.

What is claimed is:

1. In a well logging system wherein a first transducer is utilized for generation of acoustic waves in formations adjacent the well bore and a second transducer is utilized for generation of an output signal upon detection of waves after passages through said formations, the improvement which comprises coupling means adapted to be secured at the ends thereof to said transducers and having a length predetermining their spacing one from the other, a plurality of weighting means respectively secured to said coupling means at intervals short compared to the wavelength of the acoustic waves generated by said first transducer and of mass to form with the coupling means intermediate said weighting means an acoustical filter of the type which passes acoustic waves only of frequencies below a selected frequency for preventing reception by said second transducer of acoustic waves generated by said first transducer above said selected frequency, signal-detecting means connected to said second transducer, and a second filter disposed between said second transducer and said signal-detecting means passing only frequency components of the detected signal above said selected frequency, whereby there is applied to said detecting means acoustic energy passing through the formation adjacent the well bore within a frequency range above said selected frequency to the exclusion of acoustic waves within the frequency range below said selected frequency.

2. The system of claim 1 in which supply means are provided for said first transmitter for generation of discrete compressional pulses at a selected repetition rate characterized by oscillatory variations during each pulse at a frequency higher than said repetition rate and in which said second transducer is responsive to said oscillatory variations for reproducing said compressional pulses, said acoustical filter having a low acoustical conductance for energy within a frequency range below that of said oscillatory variations, and in which said second filter passes components of the detected signal above a selected frequency near that of said oscillatory variations and attenuates the components of the detected signal below that frequency.

3. The system of claim 1 in which said acoustic energy applied to said signal-detecting means comprises a band of frequencies in the spectrum of said acoustic waves, and in which said weighting means comprise a plurality of discs secured coaxially of the longitudinal axis of the assembly including said transducers and said coupling means at intervals short compared to the length of said acoustic waves within said frequency band.

4. The system of claim 1 in which said weighting means comprises a plurality of heavy weights each having a thickness along the length of said coupling means forming a large mass compared to the mass of said coupling means along each corresponding length thereof, and in which said coupling element comprises a single element extending between said transducers.

5. The system of claim 4 in which each of said weights has a central opening coaxial of the assembly comprising said transducers, said coupling means and said weights secured to said coupling means.

6. The system of claim 1 in which said coupling means is an elongated thin-walled tube having coupling members at the respective ends thereof secured respectively to said transducers and in which said weighting means are disposed in said spaced relation interiorly of said tube.

7. The system of claim 1 in which the assembly comprising said coupling means and said weighting means is completely enclosed in a rubber sheath to form an elongated structure of substantially the same diameter as said transducers.

8. The system of claim 1 in which said transducers are enclosed in housings, said coupling means having in the regions between said weighting means a cross-sectional area which is small compared with the cross-sectional area of said housings taken transversely of their length, and in which resilient sheathing means is molded about said coupling means and said weighting means to outside dimensions substantially conforming with the outside dimensions of said housings taken from the central axis thereof.

9. The system of claim 1 in which said coupling means comprises a plurality of elongated members uniformly circumferentially disposed about a longitudinal axis common to both of said transducers, and in which said weighting means comprises weights having fastening means securing them in said spaced relation to said elongated members.

References Cited in the file of this patent

UNITED STATES PATENTS

| 1,678,116 | Harrison | July 24, 1928 |
| 2,342,813 | Mason | Feb. 29, 1944 |
| 2,350,371 | Smith | June 6, 1944 |
| 2,396,935 | Walstrom | Mar. 19, 1946 |
| 2,455,888 | Brown | Dec. 7, 1948 |
| 2,495,934 | Kondrath | Jan. 31, 1950 |
| 2,578,452 | Roberts | Dec. 11, 1951 |
| 2,595,241 | Goble | May 6, 1952 |
| 2,617,882 | Roberts | Nov. 11, 1952 |

UNITED STATES PATENT OFFICE
Certificate of Correction

Patent No. 2,757,358                                                   July 31, 1956

John O. Ely

It is hereby certified that error appears in the printed specification of the above numbered patent requiring correction and that the said Letters Patent should read as corrected below.

Column 4, lines 55 to 58, the equation should read as shown below instead of as in the patent:

$$f_c = \frac{1}{\pi \sqrt{\frac{ML}{AE}}}$$

Signed and sealed this 17th day of May 1960.

[SEAL]

Attest:
KARL H. AXLINE,
*Attesting Officer.*

ROBERT C. WATSON,
                                     *Commissioner of Patents.*